United States Patent

[11] 3,607,839

| [72] | Inventor | Harry McGrath<br>Manchester, England |
|---|---|---|
| [21] | Appl. No. | 727,015 |
| [22] | Filed | May 6, 1968 |
| [45] | Patented | Sept. 21, 1971 |
| [73] | Assignee | Imperial Chemical Industries Limited<br>London, England |
| [32] | Priority | May 10, 1967 |
| [33] | | Great Britain |
| [31] | | 21666/67 |

[54] DODECANOLACTAM POLYMERIZATION PROCESS
3 Claims, No Drawings

[52] U.S. Cl. .................................................. 260/78 L
[51] Int. Cl. ................................................ C08g 20/18
[50] Field of Search ............................................. 260/78 L

[56] References Cited
UNITED STATES PATENTS

| 3,057,830 | 10/1962 | Corbin ........................ | 260/78 L |
| 3,216,976 | 11/1965 | Schwartz et al. ............... | 260/78 L |
| 3,359,227 | 12/1967 | Amann et al. ................. | 260/78 L X |

*Primary Examiner*—William H. Short
*Assistant Examiner*—L. M. Phynes
*Attorney*—Leonard Horn ABSTRACT: Anhydrous polymerization of dodecanolactam by heating with an alkaline catalyst and an amide $R_1CONHR_2$ wherein one of $R_1/R_2$ is aryl and the other is aryl, alkyl or cycloalkyl.

DODECANOLACTAM POLYMERIZATION PROCESS

This invention relates to a process for the polymerization of dodecanolactum to produce polydodecanolactam, known in the art as Nylon 12 which is of interest for moulding and for spinning into fibers.

It is known to polymerize dodecanolactam by heating to relatively high temperatures under anhydrous conditions in the presence of alkaline catalysts, for example alkali or alkaline earth metals or their hydrides, oxides, hydroxides, carbonates or alcoholates. Polymerization under such conditions is known as anionic polymerization and this process produces polydodecanolactam which is of such high molecular weight as to be unsuitable for melt spinning and is in admixture with some residual methanolsoluble monomeric material.

According to the invention a process for the polymerization of dodecanolactam comprises heating dodecanolactam under anhydrous conditions in the presence of an alkaline catalyst and an amide of the formula: $R_1CO\ NH\ R_2$ wherein one of the radicals $R_1$ and $R_2$ is an aryl radical and the other is an aryl, alkyl or cycloalkyl radical.

Examples of aryl radicals which may be represented by $R_1$ and/or $R_2$ are phenyl, p-tolyl and $\alpha$-naphthyl. When both $R_1$ and $R_2$ represent aryl radicals these may be the same or different.

Examples of alkyl radicals which may be represented by $R_1$ or $R_2$ are methyl, ethyl, n-propyl and n-butyl, and an example of a cycloalkyl radical is cyclohexyl.

Specific examples of amides of the above formula include acetanilide, butyroanilide, benzanilide, benzoyl-p-toluidide, acetyl-$\alpha$-naphthylamine, N-butylbenzamide and benzoyl-cyclo-hexylamide.

Preferred amides are those in which $R_1$ or $R_2$ is a lower alkyl radical, that is to say an alkyl radical of not more than 5 carbon atoms.

The conditions used in the process of the invention are those already known to be suitable for anionic polymerization. That is to say, heating is carried out at a temperature of 160° to 250° C., preferably 180° to 220° C., (depending to some extent on the particular catalyst used), in a vessel from which all air and water have been removed, for example, by boiling a suitable solvent, e.g. toluene in the vessel or by evacuating the vessel and flushing with inert gas, for example nitrogen. The alkaline catalyst used may be any catalyst known in the art to be suitable for anionic polymerization particularly alkali metal hydroxides or preferably alkoxides, for example sodium hydroxide or preferably sodium methoxide or ethoxide.

In the process of our invention the amide acts as a chain stopper and effectively controls the degree of polymerization which is achieved. To produce polydodecanolactam suitable for spinning into fibers the amount of amide used should be from 0.1 to 5.0 moles percent of the dodecanolactam. Amounts higher than 5 percent reduce the molecular weight of the polydodecanolactam so much that the product is no longer useful for the production of fibers.

The amide used in the process of the invention also increases the yield of polydodecanolactam and correspondingly decreases the amount of material which may be extracted from the polymer by treatment with methanol, e.g. for 6 hours in a Soxhlet apparatus. Amides of the preferred class are the most effective ones in this respect. It is a feature of the process that no substance need be present which functions specifically as an accelerator (or cocatalyst).

As a measure of the degree of polymerization produced by the process of the invention we have relied upon determinations of the relative viscosity of a 1 percent by weight solution of the methanol-extracted polymer in m-cresol at 25° C. In order for polydodecanolactam to be useful for spinning into fibers it is desirable that the relative viscosity of the methanol-extracted polymer in m-cresol should be within the range 1.8 to 3.4 and that the percentage by weight of methanol extractable material in the crude polymer should be less than 5 percent, preferably less than 1 percent.

The invention is illustrated but not limited by the following examples in which the parts and percentages are by weight:

EXAMPLE 1

70 Parts of dodecanolactam, 0.19 part of sodium methoxide, 40 parts of toluene and 0.5 parts of acetanilide (1 mole percent) were charged into a polymerization tube 38 cms. long and 4 cms. in diameter. The tube was fitted with a head carrying a stirrer, a nitrogen lead and distillation arm. The tube was heated in ethylene glycol vapor (197° C.) for 6 hours and then allowed to cool under nitrogen. The polymer had the following characteristics:

Relative viscosity (1 percent w/w solution in m-cresol at 25° C.) 2.54

Methanol extractable material less than 1 percent.

In a comparative experiment the acetanilide was omitted, but all other conditions were unchanged. The product had the following characteristics:

Relative viscosity at 25° 17.23

Methanol extractable material 4.5 percent.

The following table summarizes further experiments in which 70 parts of dodecanolactam was polymerized in the apparatus described in example 1 under the conditions indicated:

| Example | Amide | Pts. | Moles, percent | Temp., ° C. | Rel. viscosity | Methanol extractable, percent |
|---|---|---|---|---|---|---|
| 2 | Acetanilide | 1.4 | 3 | 197 | 1.87 | <1 |
| 3 | do | 2.4 | 5 | 197 | 1.54 | 1.8 |
| 4 | Benzanilide | 2.05 | 3 | 282 | 1.49 | 5.5 |
| 5 | N-butyl benzamide | 2.65 | 4 | 197 | 1.71 | 1.7 |
| 6 | N-acetyloctadecylamide | 1.0 | 1 | 197 | 8.1 | 3.4 |
| 7 | N-benzoylcyclohexylamine | 0.7 | 1 | 197 | 2.9 | 1.2 |
| 8 | N-benzoyl-p-toluidine | 0.6 | 1 | 197 | 2.3 | 1.8 |
| 9 | Butyroanilide | 0.6 | 1 | 197 | 2.1 | 0.9 |
| 10 | N-acetyl-$\alpha$-naphthylamine | 0.6 | 1 | 197 | 2.2 | 1.1 |

We claim:

1. A process for the manufacture of polydodecanolactam which comprises heating dodecanolactam under anhydrous conditions at 160° to 250° C. in the presence of an amide and an alkaline catalyst selected from the group consisting of alkaline metal hydroxide or alkoxide, said amide having the formula:

$$R_1CO\ NH\ R_2$$

wherein one of the radicals $R_1$ and $R_2$ is phenyl, tolyl or alphanapthyl radical, and the other is phenyl, p-tolyl, alpha-napthyl radical, an alkyl radical of one to five carbon atoms, or a cyclohexyl radical, the amount of said amide being from 0.1 to 5.0 mol percent of the dodecanolactam.

2. The process according to claim 1 wherein said amide is acetanilide, butyroanilide, benzanilide, benzoyl-p-toluidine, acetyl-alpha-naphthylamine, N-butylbenzamide or benzoyl-cyclohexyl-amide.

3. The process according to claim 1 wherein said catalyst is sodium methoxide or ethoxide.